United States Patent [19]
Guerrieri

[11] 3,932,586
[45] Jan. 13, 1976

[54] REMOVAL OF OXIDES OF SULFUR FROM GASES

[75] Inventor: Salvatore A. Guerrieri, Newark, Del.

[73] Assignee: The University of Delaware, Newark, Del.

[22] Filed: Oct. 12, 1973

[21] Appl. No.: 405,757

[52] U.S. Cl. ............. 423/242; 423/563; 423/428; 423/564; 423/567
[51] Int. Cl.² ................................. C01B 17/00
[58] Field of Search ....... 423/563, 210.5, 242, 428, 423/567, 567 A, 564

[56] References Cited
UNITED STATES PATENTS

| | | | |
|---|---|---|---|
| 2,361,825 | 11/1944 | Doumani | 423/564 |
| 3,127,237 | 3/1964 | Markant | 423/428 |
| 3,438,728 | 4/1969 | Grantham | 423/563 |
| 3,533,748 | 11/1970 | Finfer | 423/567 A |
| 3,535,083 | 11/1970 | Smith | 423/567 |
| 3,542,511 | 12/1970 | Shah | 423/242 |

OTHER PUBLICATIONS

Beck, et al., 7/43, Process for Chemical Reactions In Melts, [Alien Property Cust.], Serial No. 393,258.

*Primary Examiner*—Oscar R. Vertiz
*Assistant Examiner*—Michael L. Lewis

[57] ABSTRACT

A continuous cyclic process and apparatus for removing sulfur dioxide (and if present, sulfur trioxide) from gases produced in the combustion of fossil fuels or in chemical and metallurgical processes by means of an aqueous absorption solution including potassium carbonate to absorb said oxides out of said gases whereby potassium carbonate is converted into potassium sulfite (sulfate). A two component, two stage molten process is employed to recover potassium carbonate for reuse in the absorption step and to liberate hydrogen sulfide which may be converted to elemental sulfur by well known methods.

9 Claims, 1 Drawing Figure

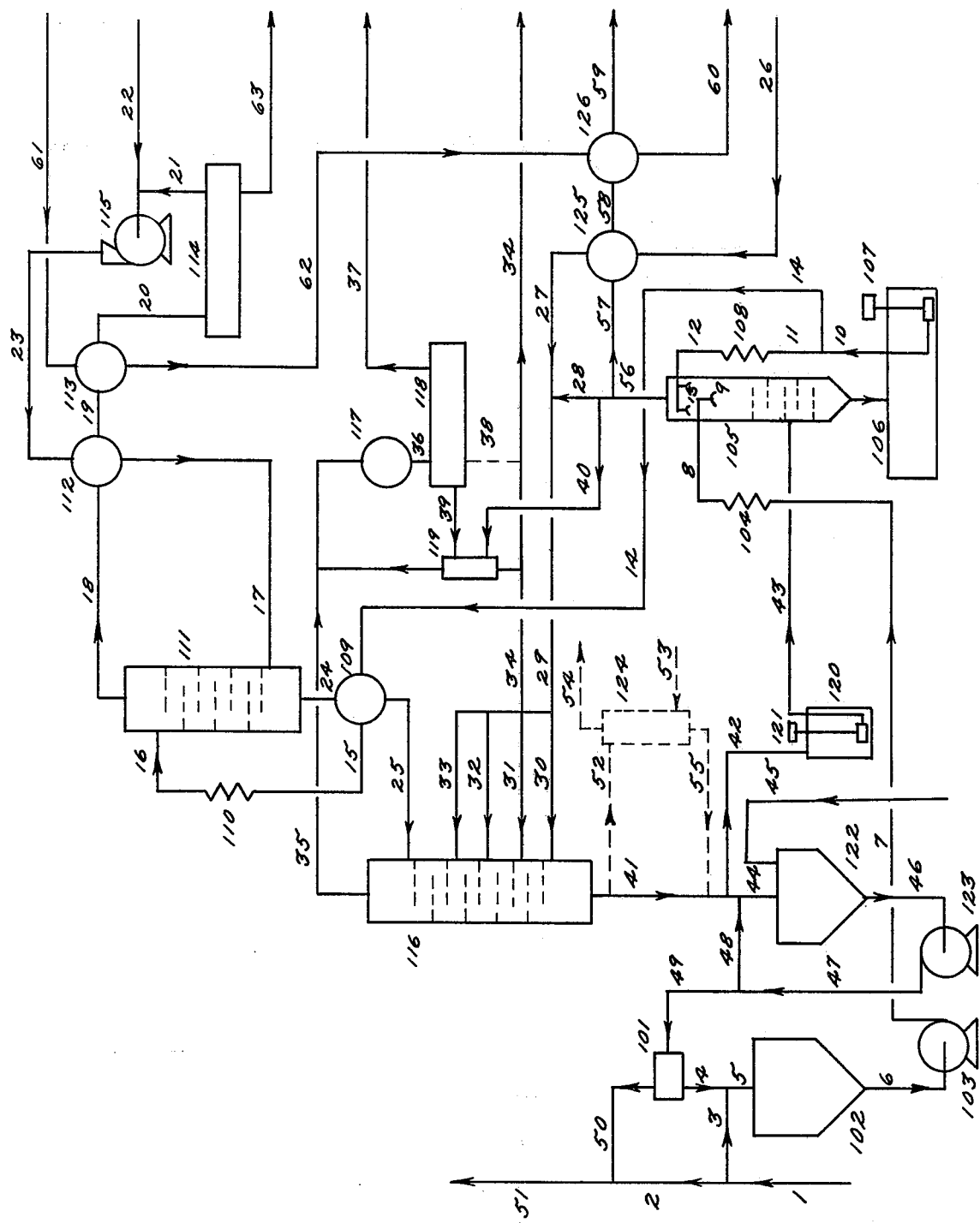

REMOVAL OF OXIDES OF SULFUR FROM GASES

BACKGROUND

1. Field of the Invention

This invention relates to the elimination of air pollution due to sulfur dioxide in industrial gases emitted into the atmosphere. Sulfur dioxide is scrubbed out of these gases by means of a reactive solution including potassium carbonate; sulfur is then recovered from the solution as hydrogen sulfide in a process which also recovers the reactive solution. The hydrogen sulfide product derived in the process may then be fed to a conventional oxidation process for the production of elemental sulfur.

2. Brief Description of the Prior Art

Sulfur is one of the most widely distributed of the elements. It occurs as a sulfide or as a sulfate in ores of metals; it is combined with organic and inorganic elements in fossil fuels. Hence in the extraction of metals from ores or in the combustion of fuels sulfur dioxide is often one of the products of the process and appears in the waste gases normally vented to the atmosphere. Although the amount of sulfur dioxide released into the atmosphere by any one source is relatively small the total quantity from all sources is large. For example, the total sulfur dioxide in the combustion products from electric power generating plants in the United States is over 20 million tons annually, substantially enough to supply all of the sulfur needed to satisfy the sulfuric acid market. Because power plant stacks are usually near densely populated areas, the effect of sulfur dioxide emissions on people and materials is within ready observation by a large segment of the population, and the result is a strong demand to abate sulfur dioxide pollution.

The widespread interest in the solution of this problem is clear when one considers the large number of processes which have been or are in various stages of development for the sole purpose of eliminating this air pollutant. Work on some of these was started even before the public clamor for action. The fact that not a single totally satisfactory method has been developed yet is a good indication of the difficulties which must be overcome to solve the problem.

Over 30 different processes have been proposed or are in various stages of development or use. These may be grouped into a few categories and may be classified generally as employing a wet or dry process.

Wet processes have had most of the attention, partly because at least a part of the technology needed was already available. These include scrubbing the gases with a lime, limestone, or dolomite slurry and discarding the spent slurry. A variation of this throw-away process is to scrub the gases with an alkali absorbent solution, and to regenerate the alkali by reaction with lime. The spent lime is discarded.

Other wet processes employ sodium or ammonium-based absorbent solutions. The ammonium-based solutions are not recoverable. One sodium-based plant is in limited commercial operation and delivers sulfur dioxide. Others are in various stages of development and will produce sulfuric acid or elemental sulfur.

Processes still in early stages of development include a formate process using a potassium salt, a citrate process, and a process using an undisclosed organic solvent.

Dry processes are generally in early development stages and include the use of activated carbon, or molten salts as the active sulfur dioxide removal agent. (See A. V. Slack, "Removing $SO_2$ from Stack Gases" Environmental Science and Technology. 7 No. 2. 100–119 (1973) for a good summary of present status.)

Up to the present time, limestone or dolomite suspensions in water are the most widely used or in advanced pilot stages. There are about 25 full-sized plant installations and 25 pilot installations. The first application of this type operation was made in England about 40 years ago. Many of the design factors developed then appear to be substantiated in today's applications. The advantages of the process are that it has had commercial operation and that the raw material is relatively cheap. The disadvantages are that the spent absorbent cannot be recovered but must be discarded, that no saleable product is made to recover at least part of the cost of $SO_2$ removal, and that, if it should be the only process used, the disposal of the spent chemical which itself may be a polluter could pose serious problems. Some work is being done to develop a method for recovering the absorbent for reuse in the process. This development, if successful, would eliminate the disposal problem and would make the process more attractive. Many operating problems, such as plugging in the absorber, are still encountered, however. Apparently the process has been installed to satisfy pollution abatement requirements primarily because it was the only available one which had been in commercial use previously.

The other wet processes are of limited interest at this time, because of cost or because much development work is still required or because the sulfur product of the process may have a limited market.

The ammonium and sodium-based absorbents, which employ regeneration by reacting spent solution with lime, avoid some of the absorption problems present in lime slurry scrubbing, but in recovering the reactive absorbent, calcium sulfite is produced just as in the slurry system and is confronted with the same supply and disposal problems.

Systems using ammonia solutions without regeneration have three important problems. Up to the present, a satisfactory way has not been found to prevent ammonia gas from passing into the atmosphere. In the second place ammonia cannot at present be readily recovered and recycled so the cost of ammonia becomes a significant charge against the operation. Finally the present product of the operation is an ammonium compound, such as ammonium sulfate, which has a limited market as a fertilizer.

Systems using sodium-based solutions without regeneration have the same features as the ammonia process except there is no problem due to fumes. The present product is sodium sulfite or bisulfite, which can be used in pulp mills, but this is a limited market and cannot be counted upon to take more than a little of the total possible production.

Sodium-based solutions with recovery and recycle are of interest because they have been extensively investigated since the early thirties. This process uses a sulfite/bisulfite cycle whereby the sulfur dioxide absorbed in the scrubber to form the bisulfite compound is released as a concentrated $SO_2$ gas in sulfite recovery step. Sulfur dioxide can subsequently be converted to sulfuric acid or to elemental sulfur. The production of elemental sulfur is an important advantage because the sulfur originally present in the waste gas as sulfur dioxide is now in a non-polluting, non-corrosive state having greatest convenience in storage, transport, and use. One important economic factor is the cost of the heat required in the recovery step, and the cost of reducing sulfur dioxide to elemental sulfur. Technologically, processes for recovering sulfur from sulfur dioxide are not as well developed as those producing sulfur from hydrogen sulfide.

At one time the use of potassium sulfite instead of sodium sulfite was advocated because of its greater solubility in water than sodium sulfite and the cost of evaporating water in the recovery step would have been considerably less than for the sodium salt. In the development of the process, two unforeseen but important difficulties were encountered. In the absorber, potassium metabisulfite was formed in addition to potassium bisulfite when sulfur dioxide in the gas reacted with potassium sulfite in the solution. The metabisulfite which is the least soluble of the three compounds crystallized out of solution and plugged the tower. In addition to this problem, a much larger amount of potassium sulfate than predicted was produced in the recovery step. A market for this product was dubious and the cost of replacing potassium too high for the process and the use of potassium as an absorption medium was abandoned.

All of the wet processes in use or being developed have their advantages and disadvantages. None of them stands out clearly as the probable candidate for long-term applications.

Among the dry processes, limestone injection into the combustion chamber has been tried but is now abandoned because of operating difficulties and because it has failed to remove $SO_2$ quantitatively. The activated carbon and the molten salt processes are still in early development stages.

Among the other processes mentioned only the molten salt process needs to be discussed because certain aspects of the process of this invention are somewhat similar. In the molten salt process, an eutectic mixture of lithium, potassium, and sodium carbonates in the molten state is sprayed into the hot waste gases where it reacts with sulfur dioxide to convert the metal carbonate into the metal sulfite. The carbonate is regenerated in a two-step process which releases a concentrated stream of hydrogen sulfide. Proven economical processes are available for converting hydrogen sulfide into elemental sulfur. The molten salt process, which is now in a pilot plant stage, is interesting because sulfur may be produced in its advantageous elemental form and because the active chemicals can be recovered and reused, thus eliminating the disposal problem.

There is, however, an important disadvantage arising from the fact that the flue gas must be contacted hot. Except for possibly a very few installations, the fly ash removal facilities of existing power plant steam generators are the last elements that the flue gas traverses in its passage from combustion chamber to stack. The gas temperature in this zone may be in the range of 250°F. to 300°F., a temperature which is well below the melting point of the eutectic. The molten salts cannot be sprayed into the flue gas ahead of the dust removal facilities where higher temperatures prevail, however, because the ash they would pick up would cause problems. Hence this process requires the removal of dust from hot gases. The use of hot electrical precipitators is possible but they have not yet been thoroughly proven in power plant service, and furthermore, are more expensive than electrical precipitators located at the cold end of the gas passage. Nevertheless, the process could be designed into new installations.

In many, if not in most of existing installations, its use would probably be difficult if not prohibitive, for three reasons. In the first place, the installation of the process would probably require the substitution of hot electrical precipitators in place of existing cold precipitators, an obviously expensive undertaking; in the second place, the setting of the existing plant usually does not have room or provision for making the kind of changes needed to install the hot electric precipitator and spray chamber. Finally, it is obvious that the unit being altered would be out of service during the construction period. The resultant loss in generating capacity during such period would be not only costly but also inconvenient in these times of energy shortages.

| References on Prior Art Employing Molten Salt Processes U.S. Pat. Nos. | |
|---|---|
| 3,438,722 | L. A. Heredy, et. al. |
| 3,438,727 | L. A. Heredy |
| 3,438,728 | Le Roy F. Grantham |
| 3,438,733 | Le Roy F. Grantham, et. al. |
| 3,438,734 | Le Roy F. Grantham, et. al. |
| 3,551,108 | Le Roy F. Grantham |

Progress Reports, Atomics International "Development of a Molten Carbonate Process for the Removal of Sulfur Dioxide from Power Plant Stack Gases" National Technical Information Service

| NTIS Number | Title |
|---|---|
| PB 191957 | Reduction |
| PB 191958 | Regeneration |
| PB 191959 | Materials Studies |
| PB 191960 | Contactor Development |
| PB 191961 | Fly Ash Studies |
| PB 191962 | Small Pilot Plant and Test Loop Design |
| PB 191963 | Plant Analysis |

3. Objectives of this Invention

Some important objectives of this invention are:

a. to combine the advantages of wet scrubbing with the advantages of molten salt chemicals recovery, in order to eliminate some of the handicaps in current processes, b. to provide a cyclic process employing a reactive aqueous absorption solution which effectively removes oxides of sulfur from gases, regenerates the absorption solution for reuse in the gas cleaning stage, and delivers a sulfur compound readily convertible into elemental sulfur, c. to provide for economical recovery of the absorption solution, d. to avoid plugging the absorption stage and other components of the process due to deposition of insoluble components which otherwise may be formed in the absorption step of the process, e. to minimize the loss of absorption medium due to the formation of sulfur compounds not readily decomposed in the regeneration step for recovery of the original absorption medium, f. to avoid polluting the atmosphere by the absorption medium, g. to provide an absorption medium inherently capable of quantitatively removing oxides of sulfur from the gases, and/or h. to minimize interference with plant operation when the process is installed in existing installations.

These and other objectives will become apparent in the following description of the invention.

SUMMARY OF THE INVENTION

The gases to be desulfurized are passes through a vapor-liquid contactor where the oxides of sulfur are dissolved in an aqueous solution including potassium carbonate to derive a solution which includes potassium sulfite and carbonate.

The recovery of potassium carbonate and the sulfur values is accomplished in a two-state molten process wherein the two princpal components of the smelt are potassium carbonate and lithium carbonate and may include up to five percent of a metal sulfide reduction catalyst which is stable but insoluble in water for example, cuprous sulfide, ferrous sulfide, stannous sulfide and zinc sulfide.

The solution from the absorber is combined with granular lithium carbonate and the insoluble metal sulfide reduction catalyst if desired wherein the solids are held in suspension in the solution in the form of a slurry. The water is evaporated from the slurry and the solid residue is melted, preferably by preheating the slurry in a fired heating zone and then evaporating the water out of the slurry in a direct contact second heating zone heated by means of a recirculating stream of hot smelt. Although the sulfur compounds in the smelt may be reduced to the sulfide by means of hydrogen, carbon monoxide, carbon, or by a mixture of these reducing agents, the use of hydrogen alone is preferred.

The smelt is contacted with hydrogen at an elevated pressure and temperature in a countercurrent operation in a plurality of stages in order to reduce oxidized sulfur compounds to sulfides. Some of the sulfide product may be returned to the reducer while the rest is transferred to a second reactor where the sulfides are converted into carbonates by contacting them at a lower pressure and temperature with a mixture of carbon dioxide and water vapor, releasing hydrogen sulfide in the process. The temperature in the reactors is controlled by the temperature of the entering feed streams and, when necessary, by injecting water.

Some of the carbonate product from the second reactor is recycled to the second heating zone, the rest of the smelt is cooled and mixed with enough hot water to give a concentrated solution of potassium carbonate, either directly out of the carbonator or after the smelt has been contacted with air in a third reaction zone. The solution is returned to the absorber while the insoluble lithium carbonate and metal sulfide reduction catalyst are recycled to the recovery step.

DESCRIPTION OF THE DRAWING

The drawing is a simplified flow plan of the process. It will be discussed in detail in connection with the preferred embodiments of the invention.

PREFERRED EMBODIMENT

The absorber (not shown in the drawing) is operated with a concentrated solution of salts including potassium carbonate. The potassium salt is used instead of sodium because it is much more soluble than sodium and there is a significant saving in the heat needed to evaporate the water in the recovery section of the process. The recovery process avoids the formation of salts of low solubility in the absorber and of potassium sulfate in the recovery section, both of which occurrences were severe handicaps in earlier attempts to use potassium salts. In fact the recovery process of this invention is capable of recovering potassium carbonate from the sulfate. Thus unlike earlier processes employing potassium salts, chemical losses will be only those due to mechanical losses and will therefore be minimal.

Furthermore, the use of potassium carbonate in the absorption stage instead of potassium sulfite used in earlier processes makes possible quantitative removal of sulfur dioxide, if desired, because the partial pressure of sulfur dioxide over a carbonate solution is nil unlike a sulfite/bisulfite solution where there is a positive sulfur dioxide partial pressure over the solution. Thus in the latter case complete removal of sulfur dioxide is practically as well as theoretically impossible.

The aqueous solution of potassium carbonate and potassium sulfite from the absorber (not shown in the drawing) flowing in line 1 is divided into two parts. A portion is returned to the absorber through line 2 while the remainder is introduced into the recovery section through line 3. The solution flowing in line 3 and lithium carbonate granules plus an insoluble metal sulfide reduction catalyst discharged from separator 101 in line 4 are combined in receiver 102 which is the feed preparation tank for the recovery section. Because lithium carbonate is only slightly soluble, the mixture in tank 102 is substantially a slurry of lithium carbonate and catalyst practicles suspended in the solution from the absorber.

The slurry flows out of tank 102 through line 6 to pump 103 which delivers it through line 7, a first heating zone (heater 104), line 8 and spray nozzles 9 into a second heating zone (evaporator-melter 105), where the water in the feed is evaporated and the dried solids are melted by heat exchange with the hot recycled smelt spray in the unencumbered upper chamber followed by flow over baffles in the lower chamber. The melted solids flow into accumulator 106 which may be constructed integrally with the evaporator-melter (but shown as a separate item solely for clarity). Heating means are provided for tank 106 to keep the temperature there always the melting point of the smelt.

Smelt is pumped out of tank 106 by pump 107 through line 10. A portion of the smelt is diverted into line 11 through a third heating zone (heater 108), line 12 and spray nozzles 13 into evaporator-melter 105. There the hot smelt spray exchanges heat with the slurry spray out of sprays 9 whereby the water in the feed is evaporated and the solids are melted.

Another portion of the smelt flowing in line 10 is diverted into line 14 and passed through heat exchanger 109, line 15, a fourth heating zone (heater 110), and line 16 into a first reaction zone, reducer 111. Reducer 111 includes a plurality of vapor-liquid contacting means to optimize the conditions for the reduction reaction. For this purpose, hydrogen is introduced into the bottom of said reducer through line 17 and therein flows upward countercurrent to the downflowing smelt. Gaseous products of the reaction plus unreacted hydrogen flow out of reducer 111 through line 18, heat exchanger 112, line 19, heat exchanger 113 and line 20 into separator 114. Said exchangers cool the gases and condense most of the water vapor product of the reduction reaction. The condensate is withdrawn from separator 114 through line 63 and may be used in preparing the recycle absorption solution or it may be discarded according to the demands of the prevailing conditions.

Unreacted hydrogen leaves separator 114 through line 21 and is joined with fresh hydrogen entering through line 22. The combined stream then flows into gas compressor 115 which delivers it through line 23, heat exchanger 112, and line 17 into reducer 111 is already described.

The reduced smelt leaves said reducer through line 24, and then flows through heat exchanger 109 and line 25 into the top of a second reaction zone, carbonator 116, where it flows downward countercurrent to a stream of carbon dioxide and water vapor and by reacting with the gas stream in a plurality of stages the sulfide compounds are converted into carbonates. Carbon dioxide enters the system through line 26 and is preheated in heat exchanger 117. Leaving said exchanger through line 27 it is joined by steam entering through line 28. The gas mixture then flows into carbonator 116 through main line 29 and a plurality of laterals 30, 31, 32 and 33. If needed, for temperature control, condensate may also be introduced into carbonator 116 through line 34 and laterals 30, 31, 32 and 33.

Gaseous reaction products leave carbonator 116 through line 35 and flow into cooler-condenser 117. Uncondensable gases and condensate flow to separator 118 through line 36 where the two phases are separated. The gas phase, being primarily a mixture of carbon dioxide and hydrogen sulfide is sent through line 37 to further processing such as an oxidation unit to produce elemental sulfur. Water collected in separator 118, if found to be contaminated with hydrogen sulfide, is sent to stripper 119 through line 39. There hydrogen sulfide is stripped out by countercurrent contact with live steam introduced into said stripper through line 40. Some of the stripped condensate out of said stripper may be sent to carbonator 116 through line 34 as already described, the remainder of the condensate flowing in line 34 may be discarded or used in preparing absorption solution. If however, the condensate is free of hydrogen sulfide, it may flow through line 38, bypassing said stripper and be employed as already described in the case of the stripped condensate.

The carbonate smelt produced in carbonator 116 is discharged through line 41. A part of the smelt is diverted through line 42 to surge tank 120 and is transferred from there by pump 121 and line 43 to evaporator-melter 105. The remainder of the smelt flows through line 44 to receiver 122. Condensate and fresh water are introduced through line 45 to prepare the absorption solution. The solution containing suspended insoluble lithium carbonate leaves receiver 122 and flows through line 46 to pump 123. The discharge from the pump, flowing through line 47 may be divided into two parts. One part may be recycled to receiver 122 through line 48, the other continues to separator 101 through line 49.

The solution leaves said separator through line 50 and combines with absorber recycle solution flowing in line 2 and the combined stream then flows to the absorber (not shown) through line 51. The lithium carbonate granules (and catalyst), separated from the solution by separator 101 are recycled to the recovery section through line 4 as already described.

In case carbonator 116 does not completely convert the sulfides to carbonates, atmospheric pollution could occur from decomposition of the sulfides in the absorber. To provide against such occurrence, a third reaction zone, oxidizer 124 may be included. In this case the smelt from the carbonator would flow through line 52 into said oxidizer where it would be contacted with air introduced into said oxidizer through line 53, and the sulfides would be converted to oxygenated sulfur compounds. The gas from oxidizer 124, if free of pollutants, may be discharged into the atmosphere; however, to be safe these gases may be released into the combustion chamber of the nearest furnace. The smelt, including the oxygen compounds, flows out of oxidizer 124 through line 55, and line 44 into receiver 122 as before. The concentration of the oxygenated compounds is small and they do no harm to the process whether carried back to the absorption tower or recycled through the recovery section where they would be decomposed along with the other oxygenated sulfur compounds.

Steam generated in evaporator-melter 105 leaves through line 56. Alternatively instead of withdrawing steam out of the top as shown on the flow plan, the steam generated in evaporator-melter may flow downward with the salts and be separated from the smelt at the bottom of the second heating zone. A portion of the steam is diverted through lines 28 and 40 as already described. The remainder, the largest portion, flows through line 57, heat exchanger 117, line 58 into the steam generator 118, where by indirect heat exchange with boiler feed water, it is condensed and clean live steam is produced from the boiler feed water. The condensate is withdrawn through line 59 and is returned to process or discarded. The generated steam is piped to plant steam supply through line 60. Boiler feed water for this purpose is brought in through line 61, preheated in heat exchanger 113, and is then introduced into steam generator 118 through line 62.

EXAMPLE OF THE INVENTION

The example of the invention which follows is based upon a power plant $SO_2$ removal system which treats 1.5 million pounds of flue gas per hour (312,000 SCFM, °C., 760 mm Hg) containing 0.19 volume percent sulfur dioxide (1900 ppm).

The potassium carbonate/sulfite solution from the absorber is fed to the recovery unit through line 3 at a rate of 35,460 pounds per hour and contains 0.38% $Li_2CO_3$, 3.7 % $K_2CO_3$, 42.28% $K_2SO_3$, and 53.6% water by weight. It flows into tank 102 where it is mixed with granular $Li_2CO_3$ introduced at a rate of 7595 pounds per hour to give a potassium-to-lithium atomic ratio of one in the mixture. Associated with the lithium carbonate granules are 400 pounds per hour of ferrous sulfide reduction catalyst. Thus the resulting slurry has approximately 18.4 weight percent solids.

The slurry discharged from pump 103 is at a pressure of about 400 pounds per square inch gauge in order to prevent vaporization of water in heater 104 and line 8 ahead of evaporator-melter 105. It is obvious, however, that the pump discharge pressure must take into account all pressure drops between the pump and the evaporator-melter 105, and the pressure in 105, which could be as much as or more than 100 pounds per square inch greater than the pressure used in this example. No difficulties are expected if some vaporization should occur there because a large number of nucleation sites are provided for crystal growth by the lithium carbonate in the slurry, but by preventing vaporization in these regions, further insurance against trouble is provided. The temperature at the outlet of heater 104 is about 420°F. and the corresponding vapor pressure of pure water is about 300 pounds per square inch gauge. The actual vapor pressure is somewhat less due to the presence of salts in solution.

The preheated slurry is sprayed into evaporator-melter 105 which is maintained at a pressure of 300 to 350 pounds per square inch gauge, preferably at about 300 pounds per square inch. In order to provide the heat necessary to evaporate the water and to melt the dried solids, 137,000 pounds per hour of smelt at about 1020°F. are heated to about 1380°F. in heater 108 and then sprayed into the top of evaporator-melter 105. There, by the transfer of heat by radiation, convection and conduction from the smelt spray to the slurry spray, water is rapidly vaporized, and solids are melted and heated to about 1020° F., and the smelt is collected in tank 106.

Tank 106 is the smelt reservoir for the whole system and is the low point for the system so that upon shutdown all of the units may be drained into this accumulator. In addition to insulation, the tank is provided with heating means to keep the contents above the melting point.

It is known that under the influence of heat potassium sulfite is disproportionated according to the equation $$4K_2SO_3 = 3K_2SO_4 + K_2S \qquad (1)$$

To provide a solvent for these compounds which amount to 15,000 pounds per hour the eutectic mixture of lithium and potassium carbonates is recirculated through the recovery system. It is brought into tank 106 through line 43 at a rate of about 44,000 pounds per hour, but obviously recirculation rate may be adjusted to the needs of local conditions. Recirculated carbonate smelt plus the sulfate/sulfide smelt derived according to equation (1) is pumped by pump 107 through lines 10 and 14, heat exchanger 109 and heater 110 into reducer 111 at a temperature of about 1380°F. (750°C) and a pressure of about 300 pounds per square inch gauge. In the reducer, the potassium sulfate in the smelt is reduced to potassium sulfide by reaction with hydrogen according to the equation $$K_2SO_4 + 4H_2 = K_2S + 4H_2O \qquad (2)$$

It is known that either hydrogen, carbon monoxide, or mixtures of the two, and carbon are suitable for this reduction process, and that hydrogen is the more reactive gas. For these reasons and to avoid pollution and poisoning problems associated with the use of carbon monoxide and carbon, hydrogen is the preferred reducing agent. It is also known that the reaction rate increases with both temperature and pressure. Both temperature and pressure should be as high as possible to enhance reaction rates but not so high as to bring about unwanted side reactions. A temperature of about 1380°F. (about 750°C) or within the range of about 700°C to about 800°C (1292°F to 1472°F). and a pressure of about 300 pounds per square inch gauge are conditions which satisfy these criteria and are practicable with available materials of construction. The use of high pressures is essential to increase the solubility of hydrogen in the smelt in order to improve the rate of reaction, and thereby reduce equipment size and cost. Furthermore, a countercurrent operation is preferred to obtain economical usage of hydrogen. Thus reducer 111 is a staged vapor-liquid contactor containing a plurality of contact zones in which smelt and hydrogen flow in generally countercurrent contact from stage to stage under conditions of maximum practical hydrogen partial pressure. In order to further maximize reaction rate and so reduce residence time and equipment size, the vapor-liquid contacting zones are designed to maximize vapor-liquid interfacial areas and to promote high turbulence in the liquid phase so as to provide a continuous supply of fresh liquid at the interface.

Furthermore, it is known that the sulfide product is a catalyst for the reaction. Therefore means may be included (not shown on the flow plan) for recirculating product from the bottom of the reducer to the top. One simple way to do this is to use the kinetic energy in the feed to jet a part of the bottom product back to the top together with the feed. Additionally or alternatively a few percent of a water-insoluble metal sulfide reduction catalyst may be included in the smelt as already stated. Such catalyst would simply recirculate through the recovery section just as lithium carbonate does and therefore is the preferred manner of providing a catalyst for the reduction step. The amount of this type of catalyst would range between one and five percent of the smelt, the preferred amount being about two to three percent.

The product leaving from the top of the reducer is a mixture of hydrogen and water vapor which passes in series through heat exchanger 112 and is cooled by incoming hydrogen and through heat exchanger 113 where it is cooled by boiler feed water and substantially all of the water vapor is condensed. Water is separated from the hydrogen gas in receiver 114 and returned to process or discarded. Hydrogen is combined with fresh hydrogen and returned to the bottom of the reducer by compressor 115. The excess hydrogen may range between 0.5 and 3 times the theoretical demand indicated by equation 2. The exact amount depends upon economic evaluations for each particular case. Because the heat of reaction is relatively low, and because equilibrium relationships are not strongly affected by temperature, temperature control within the reducer is satisfactorily effected by controlling the temperatures of the streams introduced in the reducer, but water may be injected if necessary to avoid excessively high temperatures.

The potassium sulfide in the smelt is then converted into potassium carbonate in carbonator 116, which is maintained at about 550°C., by the reaction $$K_2S + H_2O + CO_2 = K_2CO_3 + H_2S \qquad (3)$$

The equilibrium constant for this reaction decreases rapidly with rising temperature and therefore the temperature at which this reaction can be conducted is limited by the melting point of the mixture of lithium and potassium carbonates on the one hand and the maximum temperature favorable to the equilibrium, on the other. The melting point of a mixture of potassium and lithium carbonates containing between 42 and 62 mole percent lithium carbonate (which corresponds to a mole ratio of lithium carbonate to potassium carbonates (or simply lithium to potassium) between 42/58 and 62/38) varies irregularly with temperature between the limits of 508° and 490° centigrade. A 50 percent mixture melts at 505° centigrade. The lowest operating temperature must be above the melting point temperature of the mixture having the lowest melting temperature, which, in this case, is one containing 62 mole percent lithium carbonate and which melts at 490° centigrade. The highest operable temperature, which is set by the value of the equilibrium constant, is less definitely known but is about 600° centigrade. These considerations lead to a preferred temperature range of 525° to 575° centigrade, and based upon present knowledge, a temperature of 550° centigrade appears to be a reasonable compromise of all factors.

Unlike the reducer, operation of the carbonator under pressure is not practical because high partial pressures of carbon dioxide are known to cause unwanted side reactions. Furthermore, a carbon dioxide partial pressure not greater than one half atmosphere has been found best and is used here. Hence the total pressure here is only slightly more than atmospheric, and the required carbon dioxide partial pressure is controlled by controlling the steam to carbon dioxide proportions.

The hot reduced smelt from reducer 111 is cooled to 580° centigrade by heat exchange with the reducer feed in heat exchanger 109. It is further cooled by a spray of water when it enters near the top of carbonator 116. Carbonator 116, like reducer 111, is a vapor-liquid contactor having a plurality of contacting stages through which smelt and gases pass and interact in a generally counterflow mode. Mixtures of carbon dioxide and water vapor as well as sprays of water are introduced at various levels in carbonator to keep the temperature within the limits specified above.

The gaseous reaction products comprising primarily carbon dioxide, water vapor and hydrogen sulfide flow out of the top of the carbonator through water cooled cooler-condenser 117 and into receiver 118 where water and gas are separated. The gas, essentially a humid mixture of carbon dioxide and hydrogen sulfide is transferred to a sulfur recovery unit or other use. The water is returned to process or discarded. A small stripper 119 is included to strip out any hydrogen sulfide that may be present in the condensate to avoid contamination or pollution when reusing or disposing the condensate. Steam for stripping is a part of the steam generated in evaporator-melter 105. Low pressure plant steam may be used alternatively. Gas and vapors from the stripper are conducted to condenser 117 together with the main body of vapors flowing in line 35.

The reduction reaction may be difficult to complete and some unconverted potassium sulfide may remain in the product. If this were sent to the absorber the sulfide could be decomposed there releasing hydrogen sulfide which would eventually pass into the atmosphere. To avoid such happening an oxidizer 124 may be included, where, by contacting the smelt with air, the sulfide is converted into the oxide or into a relatively stable oxidized sulfur compound which will not lead to air pollution when included in the chemicals used in the absorber solution.

The recovered potassium and lithium carbonates, carbonates, from either the carbonator 116 or oxidizer 124 are cooled and combined with boiling water in dissolver 122. Here, to separate these two salts, advantage is taken of the fact that potassium carbonate is highly soluble in water whereas lithium carbonate is only slightly soluble; the concentrated aqueous solution of the former is returned to the absorber while undissolved lithium carbonate is returned to the recovery section. The separation is carried out hot to take advantage of the fact that lithium carbonate solubility decreases with increasing temperature and thus to obtain an even sharper separation of the two carbonates. If a heavy metal sulfide is used as a catalyst in the reducer, this will remain with the lithium carbonate and be recycled to the recovery section because such sulfides also are not soluble in water.

As already described some of the steam generated in evaporator-melter 105 is used in the recovery section. A major part of the steam could be made available for general plant use but because of the possibility of contaminants being present, using it to generate clean steam is preferred. This is done by condensing this steam in heat exchanger 118 and generating steam at 250 pounds per square inch gauge pressure from boiler feed water. In this manner approximately 20,000 pounds of steam are generated hourly; the heat recovered in this manner is about 40% of the fuel fired in the recovery process.

Preferred embodiments and alternatives of the invention have been shown and described. It is understood, however, that these are merely illustrative and that changes may be made without departing from the scope or the broader aspects of the invention as claimed.

I claim:

1. A process for removing sulfur dioxide from gases which includes;
   a. contacting said gases and absorbing sulfur dioxide therefrom with an aqueous solution containing potassium carbonate to derive a solution which includes potassium sulfite as well as potassium carbonate and withdrawing said derived solution,
   b. returning to step (a) a portion of said derived solution from step (a),
   c. introducing lithium carbonate granules into another portion of said derived solution from step (a) to form with said solution a slurry mixture wherein the molar ratio of lithium to potassium is between 42/58 and 62/38,
   d. passing said mixture through a first heating zone under pressure and dispersing it into a second heating zone under pressure where water is evaporated and solids are melted, producing a smelt,
   e. superheating a portion of said smelt by passing it through a third heating zone, dispersing said superheating smelt into the said second heating zone where it supplies the heat needed to evaporate water and to melt the solids of the incoming mixture,
   f. passing another portion of said smelt through a fourth heating zone and then into a first reaction zone wherein, by contact with hydrogen, the oxygenated sulfur compounds in the smelt are reduced to sulfides,
   g. transferring the sulfide containing smelt to a second reaction zone wherein, by contact with a mixture of carbon dioxide gas and water vapor, said sulfides react with said gases to produce a smelt including potassium carbonate and lithium carbonate and a gas including hydrogen sulfide,
   h. transferring a portion of said smelt from step (g) to the second heating zone,
   aqueous mixing another portion of the said smelt from step (g) with water at elevated temperature to produce an anqueous solution of potassium carbonate and a residue of lithium carbonate, separating said lithium carbonate from said solution of potassium carbonate transferring said lithium carbonate to step (c), and transferring said aqueous solution of potassium carbonate to step (a).

2. The process of claim 1 wherein the potassium carbonate content of the aqueous solution contacting the sulfur dioxide bearing gas is everywhere in excess of the quantity theoretically needed to react with all of the sulfur dioxide to be removed from said gases according to the reaction $$SO_2 + K_2CO_3 = K_2SO_3 + CO_2$$

said excess of potassium carbonate being at least sufficient to prevent the formation of potassium metabisulfite.

3. The process of claim 1, wherein the pressure on the suspension at the outlet of the first heating zone is at least 25 pounds per square inch higher than the pressure in the second heating zone.

4. The process of claim 1, wherein the temperature of the smelt leaving the second heating zone is higher than 530° centigrade and the temperature of the smelt leaving the third heating zone is higher than 600° centigrade.

5. The process of claim 1, wherein the temperature in the first reaction zone is between 700° centigrade and 800° centigrade.

6. The process of claim 1, wherein the pressure in the second reaction zone is maintained in the range of zero to 15 pounds per square inch gauge and the temperature is maintained between 525° centigrade and 575° centigrade by introducing water at a plurality of locations in the amount and in the state required to control the reaction temperature.

7. The process of claim 1, wherein that part of the smelt required for reuse in the sulfur dioxide absorption zone is passed through a third reaction zone in contact with air.

8. The process of claim 1, wherein that part of the smelt required for reuse in the sulfur dioxide absorption zone is mixed with a minimum amount of water at elevated temperature and produce a saturated solution thereof.

9. The process of claim 1, wherein the slurry mixture of step (c) includes one to five percent of a metal sulfide reduction catalyst selected from the group consisting of cuprous sulfide, ferrous sulfide, stannous sulfide, and zinc sulfide.

* * * * *